June 14, 1960 J. M. BRICAUD 2,940,177
APPARATUS FOR EXPLORING BOREHOLES
Filed Feb. 2, 1956 2 Sheets-Sheet 2

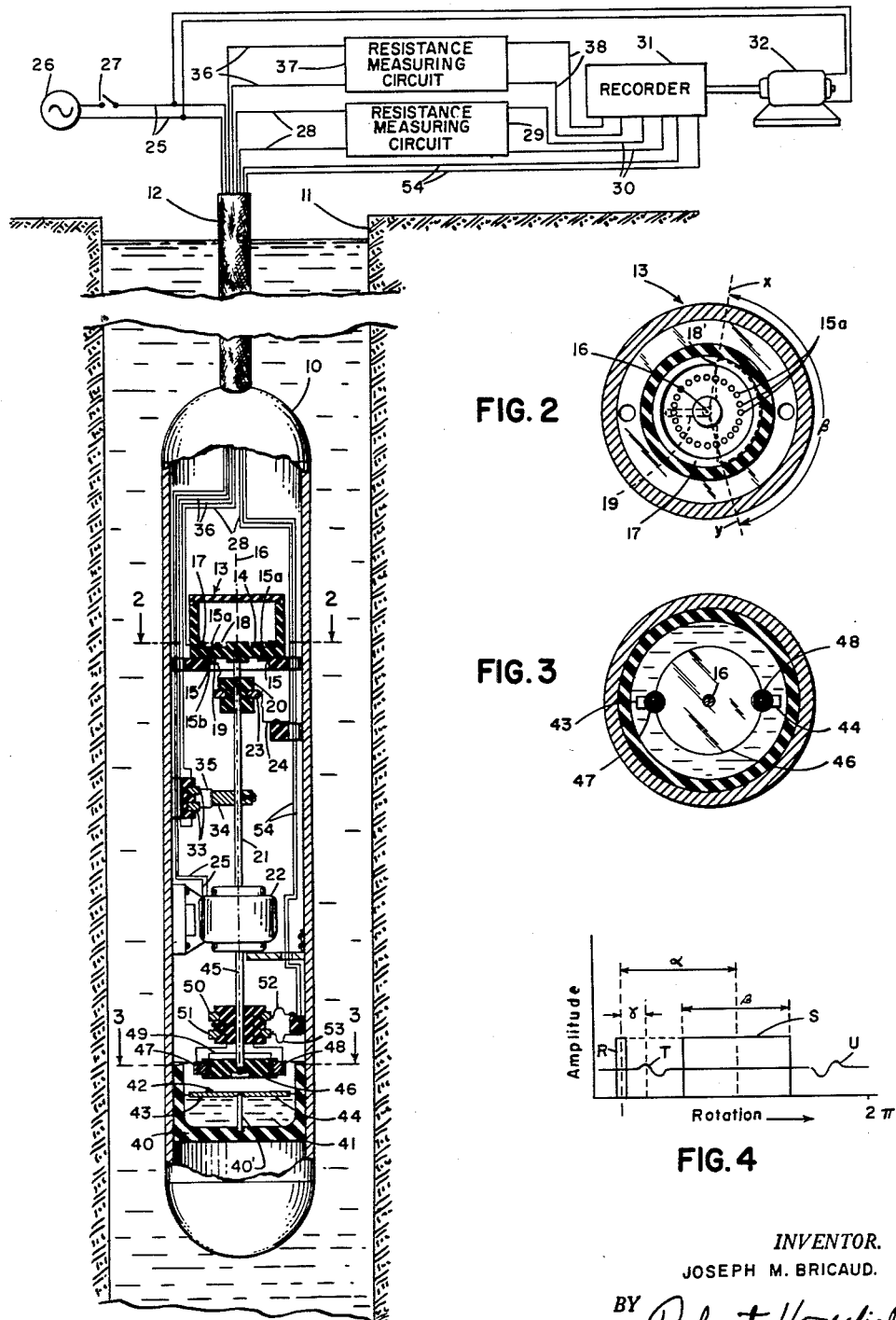

*INVENTOR.*
JOSEPH M. BRICAUD.
BY *Robert Hockfield*
HIS ATTORNEY.

United States Patent Office 2,940,177
Patented June 14, 1960

2,940,177

APPARATUS FOR EXPLORING BOREHOLES

Joseph M. Bricaud, Houston, Tex., assignor, by mesne assignments, to Schlumberger Well Surveying Corporation, Houston, Tex., a corporation of Texas Filed Feb. 2, 1956, Ser. No. 563,100

3 Claims. (Cl. 33—205.5)

This invention relates to apparatus for exploring boreholes and, more particularly, pertains to new and improved apparatus for surveying a well or a borehole to determine the inclination or drift angle thereof.

One type of apparatus used heretofore to determine the inclination of a borehole is comprised of a pendulum supported within a housing adapted to be passed through the borehole. Since the housing ordinarily rests against the sidewall of the borehole, it assumes the inclination angle of the borehole while the pendulum maintains a vertical reference. By sensing the relative position of the pendulum and the housing, the inclination of the borehole may be determined and recorded.

It is obvious that for good accuracy free movement of the pendulum should be preserved. Specifically, the length and weight of the pendulum should be large enough to develop sufficient torque to minimize restraining effects of friction in the support for the pendulum and of forces created by the position-sensing means. The torque requirement has been met with relatively good success and apparatus of the foregoing type has been generally satisfactory. However, there is at present a trend toward drill holes of smaller diameters. Thus, the size of the borehole apparatus must be appreciably reduced with an attendant reduction in the size of the pendulum. Of course, a smaller pendulum may not produce the torque required to provide a desired accuracy in the determination of inclination.

It is, therefore, an object of the present invention to provide new and improved apparatus for exploring boreholes to determine the inclination or drift angle thereof in a highly effective and accurate manner.

Another object of the present invention is to provide a new and improved inclinometer which may be small in size and yet affords relatively accurate indications of drift angle.

Apparatus in accordance with the present invention comprises a support adapted to be passed through the borehole drilled into the earth while assuming the inclination angle of the borehole. Means carried by the support defines an electrically insulating container for receiving an electrically conductive liquid and a plurality of electrical conductors have contact portions distributed along a closed path within the container. The apparatus further comprises means for repetitively scanning the electrical conductors to derive an electrical signal representing the instantaneous position of the liquid relative to a reference. Means are provided for obtaining indications responsive to the electrical signal thereby to denote the inclination angle of the borehole.

In accordance with a specific aspect of the present invention, the container has a floor portion of a particular configuration and the contact portions of the electrical conductors are distributed along the path in a plane spaced from the floor portion. Thus, by appropriately constructing the floor portion, the apparatus may exhibit a desired characteristic. For example, the floor portion may be in the form of a flat plane. Alternatively, it may be either convex or concave as viewed from within the container.

In a particular embodiment of the invention, a floor portion of generally convex configuration is employed and the electrical conductors occur in a first group having contact portions distributed within a closed path about a longitudinal axis for the support and in a second group having contact portions distributed along another closed path about the longitudinal axis. By scanning each of the two groups of conductors, individual electrical signals are derived representing the instantaneous position of the liquid relative to contact portions of the two groups.

According to another aspect of the present invention, a bar magnet is carried by the support for rotational movement. Means is provided for repetitively scanning the bar magnet to derive an electrical signal representing the instantaneous position of the bar magnet relative to a reference. By deriving indications of the latter as well as the earlier-mentioned electrical signals, the inclination angle and its direction may be determined.

The novel features of the present invention are set forth with particularity in the appended claims. The present invention, both as to its organization and manner of operation, together with further objects and advantages thereof, may best be understood by reference to the following description taken in connection with the accompanying drawings in which:

Fig. 1 is a view in longitudinal cross section of borehole apparatus embodying the present invention shown in operative position within a borehole;

Figs. 2 and 3 are cross sectional views taken along lines 2—2 and 3—3, respectively, of Fig. 1 and drawn to an enlarged scale;

Fig. 4 represents a typical record which may be obtained through the use of the apparatus shown in Figs. 1–3;

Figure 5:
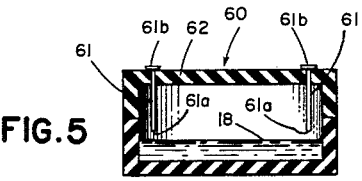
Figs. 5, 6, 7, 8 and 9 illustrate modifications which may be made to the apparatus of Fig. 1.

In Fig. 1 of the drawings, apparatus embodying the present invention is shown to comprise a housing or support 10 suspended in a borehole 11 by an electric cable 12. The cable 12 is employed together with a winch (not shown) at the surface of the earth for lowering and raising housing 10 through borehole 11 in the customary manner. Although the housing 10 is shown as centered within borehole 11, it will be understood that this is a highly idealized condition which occurs only when the borehole is perfectly vertical. However, in the usual case, the borehole is inclined with respect to true vertical and housing 10 rests against the sidewall. Thus, the housing assumes the inclination of the borehole and the apparatus embodying the invention may be employed to determine the amount and direction of such inclination.

Supported within housing 10 is an essentially cylindrical container 13 constructed of an electrically insulating material, such as Bakelite, or the like. The container has a floor portion 14 of essentially flat configuration through which a plurality of electrical conductors 15 project. Preferably the conductors 15 are equally spaced from one another so that their upper ends 15a form contact portions which are distributed about a longitudinal axis 16 for housing 10 along a closed, circular path within container 13, as shown best in Fig. 2. Any desired number of conductors may be employed providing a required accuracy in the determinations of inclination. The conductors 15 also have contact portions 15b which define a closed, circular path below the floor 14.

An electrically conductive ring 17 having a diameter greater than the diameter of the path of conductor ends 15a is disposed on the floor 14 at the junction with the sidewall of container 13. Also received within container 13 is a quantity of an electrically conductive liquid 18 which may, for example, be composed of mercury freely movable within the container. An amount of liquid 18 is used so that in the position shown in which the longitudinal axis 16 of housing 10 is aligned with the true vertical, the liquid engages contact portions 15a of all of the conductors 15 and the entirety of ring 17. The level of the liquid 18, however, should be low enough so that when the axis 16 is tilted slightly, one or more of the contact portions 15a becomes exposed, i.e., the conductive connection between one or more of the contact portions and ring 17 through liquid 18 is broken.

To determine the instantaneous position of liquid 18 relative to a reference, such as the plane of contact portions 15a, an electrical contactor 19 is supported for movement along a path successively to engage the portions 15b of the electrical conductors 15. More specifically, contactor 19 is fixed to an electrically insulating support 20 mounted to a shaft 21 of a driving motor 22. Shaft 21 is aligned with the longitudinal axis 16 and an electrical connection to the contactor 19 is completed by means of a slip ring 23 carried by insulator 20 and cooperating with a brush 24.

Preferably, motor 22 is of the synchronous type whose shaft rotates at a speed dependent upon the frequency of an alternating potential supplied via conductors 25 of cable 12 from a source of alternating potential 26 at the surface of the earth. If desired, an operating switch 27 may be provided for source 26.

In order to derive an electrical signal representing the instantaneous position of the liquid 18, electrical connections from ring 17 and brush 24 are completed by means of cable conductors 28 to a resistance-measuring circuit 29 of conventional construction located at the surface of the earth. Circuit 29 provides at leads 30 a voltage which increases in a positive direction whenever the resistance between conductors 28 decreases. This voltage is applied to a conventional recorder 31 which may be of the type commonly used in facsimile reproduction. Thus, a synchronous driving motor 32 energized by source 26 drives a stylus (not shown) in the recorder in synchronism with electrical contactor 19. In addition, the recording medium within recorder 31 is displaced in proportion to movement of housing 10 through the borehole 11.

To derive a position reference for shaft 21, a pair of electrical contacts 33 are supported within, but electrically insulated from housing 10. An arm 34 extends from shaft 21 and has a contactor portion 35 positioned to engage contacts 33 once for each rotation of the shaft 21. Contacts 33 are coupled by a pair of conductors 36 of cable 12 to another resistance-measuring circuit 37 whose output leads 38 are connected to recorder 31.

The portion of the apparatus thus far described may be employed, in a manner to be discussed hereinafter, for determining the inclination angle of borehole 11. The direction of this inclination angle with respect to a reference, such as magnetic north, may be obtained by finding the orientation of the housing 10. Accordingly, the lower end of the housing is constructed of a non-magnetic material, and supported therein is a non-magnetic container 40 for a liquid 41 which may, for example, be mercury on whose surface floats a bar magnet 42. The bar magnet thus is effectively mounted on support 10 for rotational movement whereby its end poles 43 and 44 describe an annular path about the longitudinal axis 16. If desired, a pivot rod 40' may be employed to restrict transverse displacement of magnet 42.

A downwardly extending shaft portion 45 of driving motor 22 is connected to a non-magnetic support 46 carrying a pair of coils 47 and 48. The axes of coils 47 and 48 are parallel to but radially displaced from the longitudinal axis 16. As best seen in Fig. 3 coils 47 and 48 are opposite one another and are movable along a path co-extensive with movement of end poles 43 and 44.

One terminal of coil 47 is connected to one terminal of coil 48 by a lead 49 and the remaining terminals of the coils are connected to slip rings 50 and 51. Brushes 52 and 53 are associated with the slip rings and are coupled by conductors 54 of cable 12 to recorder 31. The portion of recorder 31 to which coils 47 and 48 are coupled should have a relatively high input impedance so that the scanning system does not influence magnet 42.

Although independent scanning may be employed for the inclination and direction parts of the system together with separate indicators, preferably shafts 21 and 45 rotate at the same speed. Thus, the recording sweep in recorder 31 may have a period equal to the time required for a single rotation of these shafts. For instance, source 26 may provide an alternating potential having a frequency of 60 cycles per second and motor 22 is selected to provide a speed, directly or through an appropriate gear reduction, of three revolutions per second. To accommodate this speed, motor 32 is selected so that a single sweep in the recorder 31 occurs in one-third of a second. Of course, any other speed may be employed so long as it is fast enough to effect a complete scan before housing 10 moves appreciably as it travels through borehole 11. For example, the rotational speed may be in a range from one-half to five revolutions per second.

Obviously, any other system for obtaining synchronous operation may be employed. Thus, the well known form of step-by-step follow-up may be used. Alternatively, a conventional servo system utilizing position selsyns in a follow-up circuit is entirely suitable.

In operation, housing 10 is passed through borehole 11 with switch 27 closed so that source 26 energizes motors 22 and 32. Accordingly, brush 35 is carried into engagement with contacts 33 once during each revolution of shaft 21 and electrical contactor 19 is continuously displaced along the path intercepting contact portions 15b of conductors 15. In addition, coils 47 and 48 scan bar magnet 42 and the recording stylus (not shown) in recorder 31 is displaced in synchronism with rotation of shafts 21 and 45.

Each time contacts 33 are shorted by contactor 34, a positive reference pulse is supplied to recorder 31 denoting a reference position of shafts 21 and 45 relative to housing 10. This signal is represented by pulse R in Fig. 4 which is a plot of signal amplitude versus shaft rotation. In the recorder, however, an increase in amplitude produces a darkening in a line trace. Thus, during each scanning cycle, a short dash-like representation corresponding to the width of pulse R is recorded.

When axis 16 coincides with true vertical, liquid 18 completes electrical connections between all of the contact portions 15a and conductor 17. Hence, for every one of the contact portions 15b engaged by electrical contactor 19, a low resistance appears between leads 28 and a positive voltage is supplied over conductors 30 to the recorder throughout an entire sweep. This condition is not represented in Fig. 4.

When, however, the wall of borehole 11 is inclined with respect to true vertical, housing 10 assumes a corresponding inclination and liquid 18 finds a new level within container 13 at which one or more of the contact portions 15a is exposed. For example, as shown in Fig. 2 the inclination may cause liquid 18 to be displaced to a position defined in dash outline 18' in which the contacts within the outline are engaged by the liquid while the contacts outside the outline are not engaged by the liquid. Thus, in a scanning cycle the electrical resistance between electrical contactor 19 and conductive ring 17 is high until one of the contact portions 15a immersed in liquid is engaged by contactor 19 such as the one lying along radial line X in Fig. 2. At this time the electrical resistance becomes very low and a positive voltage is supplied to recorder 31. This voltage persists until the last of the immersed contacts is engaged, as denoted by broken line Y in Fig. 2, the angular displacement between radial lines X and Y being denoted by the reference character $\beta$.

It is evident that in each repetitive scan of electrical contactor 19 a signal, as represented by rectangular pulse S, is derived. This pulse has a duration $\beta$ which is a fraction of the interval $2\pi$ and corresponds to the angle $\beta$ illustrated in Fig. 2. It is further apparent that the extent of angle $\beta$ or the width of pulse S in Fig. 4 is a measure of the amount of inclination of longitudinal axis 16 with respect to true vertical. Moreover, the spacing in time between the mean positions of pulse R and indication S denotes the relative position of liquid 18 with respect to the several contact portions 15a. In other words, distance $\alpha$ in Fig. 4 is representative of the relative azimuth of the liquid 18. Of course, for the inclination considered, each line trace in recorder 31 is darkened in correspondence with the durations of pulses R and S.

To obtain the true azimuth of the inclination it is only necessary to determine the orientation of housing 10 relative to true north. To this end shaft 45 rotates continuously and carries coils 47 and 48 about an annular path scanning end poles 43 and 44 of the bar magnet 42. Each time one of the coils approaches one of the end poles and comes within the influence of the magnetic field thereof, an electrical current is generated. The coils are connected in aiding relationship so that although they pass over end poles of opposite magnetic polarities at the same time, a current impulse represented by the reference character T in Fig. 4 is supplied over conductors 54 and to recorders 31. It will be appreciated that during each cycle of rotation the coils 47, 48 intercept the end poles of magnet 42 twice so that another impulse designated by the letter U in Fig. 4 is produced. The impulses T and U are of different character, namely, impulse T has a positive-going portion followed by a negative-going portion while impulse U has an initial negative-going portion followed by a positive-going portion and a selected one of the impulses may be correctly identified. Of course, the accompanying indication in the record produced by recorder 31 has corresponding fluctuations in the darkness of the trace. By measuring the displacement $\gamma$ between the center of reference pulse R and the center of impulse T, for instance, the departure of housing 10 from magnetic north can be determined. Accordingly, the true azimuth of the inclination may be readily calculated.

It is thus evident that as housing 10 is passed through borehole 11 successive traces are presented in recorder 31 for the repetitive scanning cycles. Of course, the values of the quantities $\alpha$, $\beta$ and $\gamma$ vary from trace to trace thereby providing essentially continuous indications of the inclination angle and azimuth of housing 10.

It may be seen that since liquid 18 is freely movable within container 13 it may readily assume a position accurately representative of the inclination of housing 10. Furthermore, since the scanning mechanism including contactor 19 and contact portions 15b produces no mechanical force on the liquid 18, the position of the liquid is completely independent of the scanning system. Therefore, apparatus embodying the present invention may be employed to determine the inclination or drift angle of a borehole with relatively great accuracy and yet may be considerably more compact than prior arrangements.

Where large inclination angles are encountered, it may be desirable to construct shaft 45 in two parts connected by a suitable universal joint, and preferably this assembly should be non-magnetic.

In constructing the container 13 illustrated in Fig. 1, preferably a material should be used which has approximately the same expansion co-efficient as the conductive liquid 18. Also, to avoid oxidation, the space within container 13 above the surface of the liquid 18 should be evacuated or filled with an inert gas.

Although only a single brush or contactor 19 has been illustrated, a pair of slightly displaced brushes may be employed. These brushes may be electrically insulated from one another and connected to leads 28 thereby obviating the need for conductive ring 17.

Obviously, instead of projecting through the floor of the insulating container, the conductors 15 may project through the roof as illustrated in Fig. 5. Thus, there is provided an electrically insulating container 60 and electrical conductors 61 that extend through a lid portion 62. The lower extremities 61a of electrical conductors 61 constitute contact portions distributed about a closed path within container 60, while their upper ends 61b are disposed outside of lid 62. Accordingly, an appropriate electrical contactor may be provided for repetitively scanning the conductors 61 so that the instantaneous position of liquid 18 relative to the conductors may be determined in the same way discussed in connection with the embodiment of Figs. 1–3.

It will be appreciated that the function $\beta=f(\Delta)$, where $\beta$ is the extent of the indication of S in Fig. 4 and $\Delta$ is the inclination angle, depends upon the configuration of the floor 14 of container 13. Thus, while the floor 14 is shown as being in a flat plane in Fig. 1 other configurations may be appropriately employed.

Figure 6:
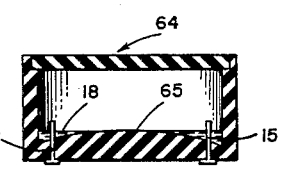

For example, as illustrated in Fig. 6, a modified container 64 is provided having a floor 65 of generally convex configuration, as viewed from within the container. This configuration provides good sensitivity for small inclination angles.

Figure 7:
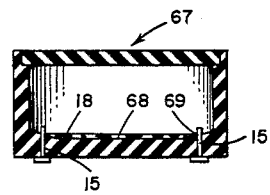

Alternatively, a modified container 67 may be employed which, as shown in Fig. 7, has a floor comprised of a flat, central section 68 surrounded by an outer, frusto-conical section 69. Stated more generally, the floor is of concave configuration as viewed from within the container. In this way, greater sensitivity for large inclination angles may be afforded.

Of course, by using both the containers 64 and 67 of Figs. 6 and 7 with an appropriate scanning arrangement for each to determine the position of liquid 18 relative to contacts 15, a two-sensitivity system may be conveniently provided.

Figure 8:
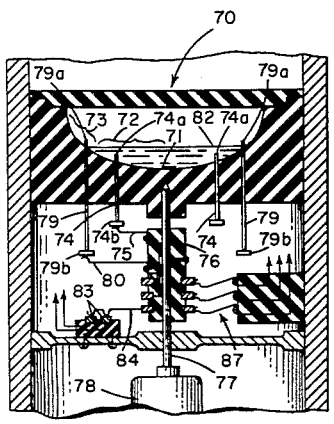

Another two-sensitivity system is represented in Fig. 8. An electrically insulating container 70 has a floor portion 71 of generally concave configuration when viewed from within the container. Floor portion 71 has an inner, or central section 72 of moderate curvature surrounded by an outer section 73 of relatively great curvature.

Electrical conductors 74 in a first group project through the floor 71 and have contact portions 74a distributed about a circular path within zone 72 concentric with the longitudinal axis of container 70. The lower ends 74b of conductors 74 project outside of container 70 and are adapted to be successively engaged by an electrical contactor 75. Contactor 75 is mounted to an electrically insulating support 76 carried by a shaft 77 of a driving motor 78.

Another group of electrical conductors 79 extend through floor 71 and have contact portions 79a disposed about a circular path within zone 73. The lower ends 79b of conductors 79 are arranged to be successively engaged by an electrical contactor 80 which is also carried by insulating support 76. An electrically conductive liquid 82 is received by container 70, and electrical communication with the conductive liquid is completed by an appropriate conductive ring (not shown) or through companion contacts (not shown) for each of the contacts 75 and 80.

A fixed reference is provided by means of a pair of electrical contacts 83 arranged to be engaged by an electrical contactor 84 carried by insulating supports 76. An appropriate slip ring-brush arrangement 87 is provided so that electrical connections may be made to the contactors 75, 80 and 84.

Through the use of an independent recording circuit (not shown) for each of the groups of contacts 74 and 79, operated synchronously with driving motor 78, a record may be obtained for small inclination angles using electrical conductors 74. For medium ranges of angles, both of groups 74 and 79 are involved, while for extremely large angles the record representing the group 79 alone is employed. Of course, the orientation with respect to a fixed reference is obtained since contacts 83 are shorted by electrical contactor 84 one for each revolution of shaft 77.

Figure 9:
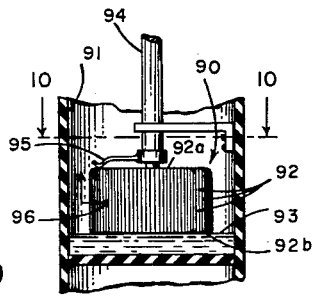

In another embodiment of the invention illustrated in Fig. 9, a rheostat 90 is supported coaxially within a cylindrical container 91. Although this container is shown as being constructed of an electrically insulating material it need not be; a conductive material is entirely suitable. The rheostat is comprised of an electrically conductive material having an appreciable resistance. This material is in the form of a wire wound in a spiral including a plurality of successive turns 92 on a generally toroidal form. The spiral is continuous, and has an upper surface of adjacent strand portions 92a and a lower surface of adjacent strand portions 92b. The rheostat 90 is so supported that the lower surface portions 92b are just barely in contact with the upper surface of a conductive liquid 93 received by container 91.

The rheostat 90 also has a coaxial shaft 94 to which an electrical contactor 95 is fixed. The contactor thus is movable along the path defined by the upper surface portions 92a of the spiral of resistance wire. The shaft 94 is adapted to be coupled to an appropriate synchronous motor (not shown) whereby the contactor 95 is displaced along its path of movement successively to engage adjacent strand portions 92a.

Appropriate electrical connections may be made to contactor 95 and to a point 96 on one of the turns 92 so that the electrical resistance therebetween may be measured. Accordingly, the instantaneous position of liquid 93 relative to the spiral of turns 92 may be determined.

When the axis of container 91 is in a true vertical position, all of strand portions 92b touch liquid 93. However, for a certain inclination angle, Δ, only a part of the spiral is short circuited by liquid 93 and a curve such as the one represented in Fig. 11 is obtained depicting rotation of contactor 95 versus the instantaneous resistance between contactor 95 and point 96. It will be seen that in Fig. 10 as well as in Fig. 11 a reference G denotes a reference position of the contactor 95 relative to housing 91 defined by point 96. The particular indication depicts an inclination angle at which the liquid 93 is positioned within container 91 so that the boundary between the intersection of the liquid with strand portions 92b and nonengagement is represented by the broken line 93' (Fig. 10).

Figure 10:
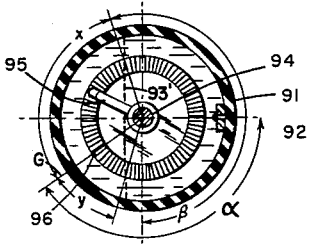
Fig. 10 is a cross-sectional view taken along line 10—10 of Fig. 9.
Figure 11:
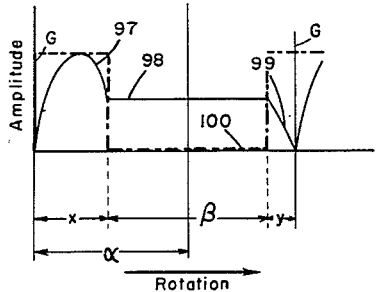
Fig. 11 represents a typical record which may be obtained by the use of the apparatus as modified in accordance with Figs. 9 and 10.

It will be appreciated that as contactor 95 moves from reference G in a clockwise direction, as viewed in Fig. 10, the resistance increases and gradually reaches a maximum value in curve portion 97. Thereafter, the resistance decreases and reaches a fixed value denoted by the horizontal line 98 when contactor 95 engages the first of the turns 92 that are immersed in liquid 93. The value 98 is maintained as contactor 95 passes over the turns 92 immersed in the liquid. When the last of the immersed turns is passed, the resistance decreases as represented by curve section 99 and reaches a minimum value when the reference point G is reached. Thereafter, the cycle is repeated periodically.

It will be seen from Figs. 10 and 11 that the intersection between curve portions 97 and 98 is spaced from reference G by an amount X corresponding to the spacing between the reference G and one radial line passing through the intersection between the liquid outline 93' and the resistance element. The quantity β represents the distance traveled by contactor 95 in passing over those of turns 92 which are immersed in the liquid 93. Thus, β in Fig. 11 is indicative of the amount of inclination. Curve portion 99 represents the distance Y traveled by contactor 95 in passing from the remaining radial line intercepting the junction between liquid outline 93' and the resistance element to the position of reference G. It is also apparent that while the quantity β in Fig. 11 represents the amount of inclination, the quantity α represents the spacing between reference G and the mean position of curve section 98. This is a measure of the direction of the inclination relative to housing 91. Of course, the true direction may be obtained by the use of a magnetic system such as the one shown in Fig. 1.

If desired, another wiper similar to the one designated 95 may be employed and set a few degrees away from it. In this way, a curve such as the one represented by broken line 100 in Fig. 11 may be obtained from which inclination may be determined in a manner apparent from the discussion hereinbefore.

Although a magnetic system has been described in connection with determinations of the true direction of inclination, obviously a gyro-compass may be suitably employed for this purpose.

While particular embodiments of the present invention have been shown and described, it is apparent that changes and modifications may be made without departing from this invention in its broader aspects, and therefore the aim in the appended claims is to cover all such changes and modifications as fall within the true spirit and scope of this invention.

I claim:
1. Apparatus for exploring a borehole drilled into the earth comprising: a support adapted to be passed through the borehole and having a longitudinal axis; means carried by said support defining an electrically insulating container having a floor portion of generally concave configuration as viewed from within said container; a quantity of electrically conductive liquid received by said container and essentially freely movable therein; a plurality of electrical conductors including a first group having contact portions within said container distributed along a closed path about said longitudinal axis, and a second group having contact portions within said container distributed along another closed path about said longitudinal axis; means for repetitively scanning said electrical conductors in each of said groups to derive individual electrical signals representing the instantaneous position of said liquid relative to contact portions of said first and said second groups of electrical conductors, respectively; and means for obtaining indications responsive to each of said electrical signals.

2. Apparatus for exploring a borehole drilled into the earth comprising: a support adapted to be passed through the borehole; means carried by said support defining an electrically insulating container having a floor portion; a plurality of electrical conductors having first contact portions distributed along a closed path within said container and second contact portions distributed along a closed path outside said container; an electrically conductive liquid disposed in said container in a quantity sufficient to cover a zone of said floor portion thereof coextensive with said closed path, but insufficient to fill substantially the volume of said container; an electrical contactor movable along a path successively to engage said second contact portions of said electrical conductors; a driving motor for displacing said electrical contactor along its aforesaid path repetitively to scan said electrical conductors; means coupled to said electrical contactor and to said liquid for deriving a first electrical signal representing the instantaneous position of said liquid relative to said first contact portions of said electrical conductors; a bar magnet mounted on said support for rotational movement and having end poles; inductor means supported for movement along a path co-extensive with movement of said end poles and mechanically coupled to said driving motor thereby repetitively to scan said end poles; means electrically coupled to said inductor means to derive a second electrical signal representing the instantaneous position of said end poles of said bar magnet relative to a reference; and means operable synchronously with said driving motor for obtaining indications responsive to said first and said second electrical signals.

3. Apparatus for exploring a borehole drilled into the earth comprising: a support adapted to be passed through the borehole and having a longitudinal axis; means carried by said support defining an electrically insulating container having a floor portion; a plurality of electrical conductors including a first group having contact portions within said container distributed along a closed path about said longitudinal axis, and a second group having contact portions within said container distributed along another closed path about said longitudinal axis; a quantity of electrically conductive liquid disposed in said container in a quantity sufficient to cover a zone of said floor portion coextensive with said closed paths but insufficient to fill substantially the volume of said container; means for repetitively scanning said electrical conductors in each of said groups to derive individual electrical signals representing the instantaneous position of said liquid relative to contact portions of said first and said second groups of electrical conductors, respectively; and means for obtaining indications responsive to each of said electrical signals.

References Cited in the file of this patent

UNITED STATES PATENTS

| | | |
|---|---|---|
| 1,375,278 | Clayton | Apr. 19, 1921 |
| 1,928,969 | Kuffel | Oct. 3, 1933 |
| 2,309,905 | Irwin et al. | Feb. 2, 1943 |
| 2,338,811 | Hasbrook | Jan. 11, 1944 |
| 2,640,275 | Boucher | June 2, 1953 |

FOREIGN PATENTS

| | | |
|---|---|---|
| 422,701 | Great Britain | Jan. 10, 1935 |